(12) United States Patent
Han et al.

(10) Patent No.: US 11,594,782 B2
(45) Date of Patent: Feb. 28, 2023

(54) FLAME RETARDANT SEPARATOR FOR SECONDARY BATTERY

(71) Applicant: LG CHEM, LTD., Seoul (KR)

(72) Inventors: Da Kyung Han, Daejeon (KR); Kwan Woo Nam, Daejeon (KR); Seung Hyun Lee, Daejeon (KR); Je An Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 205 days.

(21) Appl. No.: 16/759,944

(22) PCT Filed: May 8, 2019

(86) PCT No.: PCT/KR2019/005478
§ 371 (c)(1),
(2) Date: Apr. 28, 2020

(87) PCT Pub. No.: WO2019/216633
PCT Pub. Date: Nov. 14, 2019

(65) Prior Publication Data
US 2020/0350540 A1  Nov. 5, 2020

(30) Foreign Application Priority Data

May 11, 2018 (KR) ........................ 10-2018-0054550

(51) Int. Cl.
*H01M 50/431* (2021.01)
*H01M 4/62* (2006.01)
*H01M 50/446* (2021.01)
*H01M 50/46* (2021.01)

(52) U.S. Cl.
CPC ......... *H01M 50/431* (2021.01); *H01M 4/623* (2013.01); *H01M 50/446* (2021.01); *H01M 50/46* (2021.01)

(58) Field of Classification Search
None
See application file for complete search history.

(56) References Cited

U.S. PATENT DOCUMENTS

| | | |
|---|---|---|
| 7,976,987 B2 | 7/2011 | Nishikawa et al. |
| 8,597,816 B2 | 12/2013 | Nishikawa et al. |
| 8,815,435 B2 | 8/2014 | Nishikawa |

(Continued)

FOREIGN PATENT DOCUMENTS

| | | |
|---|---|---|
| CN | 103579562 A | 2/2014 |
| CN | 103664119 A | 3/2014 |

(Continued)

OTHER PUBLICATIONS

Wikipedia for Doyleite, 2022.*

(Continued)

*Primary Examiner* — Ula C Ruddock
*Assistant Examiner* — Tony S Chuo
(74) *Attorney, Agent, or Firm* — Birch, Stewart, Kolasch & Birch, LLP

(57) ABSTRACT

A flame retardant separator for secondary batteries, and more particularly, a flame retardant separator for secondary batteries comprising or coated with a metal hydroxide having a low Gibbs free energy among polymorphs of a metal hydroxide used as an inorganic flame retardant.

10 Claims, 4 Drawing Sheets

(56) References Cited

U.S. PATENT DOCUMENTS

| | | | |
|---|---|---|---|
| 9,017,878 B2 | 4/2015 | Kim et al. | |
| 9,029,002 B2 | 5/2015 | Nishikawa et al. | |
| 9,786,890 B2 | 10/2017 | Cho et al. | |
| 10,305,138 B2 | 5/2019 | Kim et al. | |
| 2010/0159314 A1 | 6/2010 | Kim et al. | |
| 2010/0173187 A1 | 7/2010 | Nishikawa et al. | |
| 2011/0143185 A1 | 6/2011 | Nishikawa | |
| 2011/0171514 A1* | 7/2011 | Nishikawa | H01M 50/449 429/144 |
| 2012/0115008 A1 | 5/2012 | Sano et al. | |
| 2012/0321929 A1 | 12/2012 | Nishikawa et al. | |
| 2013/0260208 A1 | 10/2013 | Cho et al. | |
| 2015/0171490 A1 | 6/2015 | Kim et al. | |
| 2016/0254511 A1* | 9/2016 | Hatta | B60L 58/12 307/10.1 |
| 2018/0277815 A1 | 9/2018 | Sung et al. | |
| 2018/0351147 A1 | 12/2018 | Ozaki et al. | |
| 2019/0031522 A1 | 1/2019 | Ozaki et al. | |
| 2019/0115620 A1 | 4/2019 | Kim et al. | |

FOREIGN PATENT DOCUMENTS

| | | | | |
|---|---|---|---|---|
| CN | 103329306 B | | 10/2017 | |
| EP | 2 662 920 A2 | | 11/2013 | |
| JP | 2006-269359 A | | 10/2006 | |
| JP | 2008-210541 A | | 9/2008 | |
| JP | 2013-89308 A | | 5/2013 | |
| JP | 2015-53180 A | | 3/2015 | |
| JP | 2016-072154 A | | 5/2016 | |
| JP | 6317536 B1 | | 4/2018 | |
| KR | 10-0833038 B1 | | 5/2008 | |
| KR | 10-0971108 B1 | | 7/2010 | |
| KR | 10-2012-0079515 A | | 7/2012 | |
| KR | 10-2014-0136807 A | | 12/2014 | |
| KR | 20140136807 A | * | 12/2014 | C08J 5/18 |
| KR | 10-2017-0007210 A | | 1/2017 | |
| KR | 10-1716907 B1 | | 3/2017 | |
| WO | WO 2017/010780 A1 | | 1/2017 | |

OTHER PUBLICATIONS

International Search Report for PCT/KR2019/005478 (PCT/ISA/210) dated Aug. 8, 2019.

Extended European Search Report for European Application No. 19799898.2, dated Dec. 21, 2020.

\* cited by examiner

[FIG. 1]
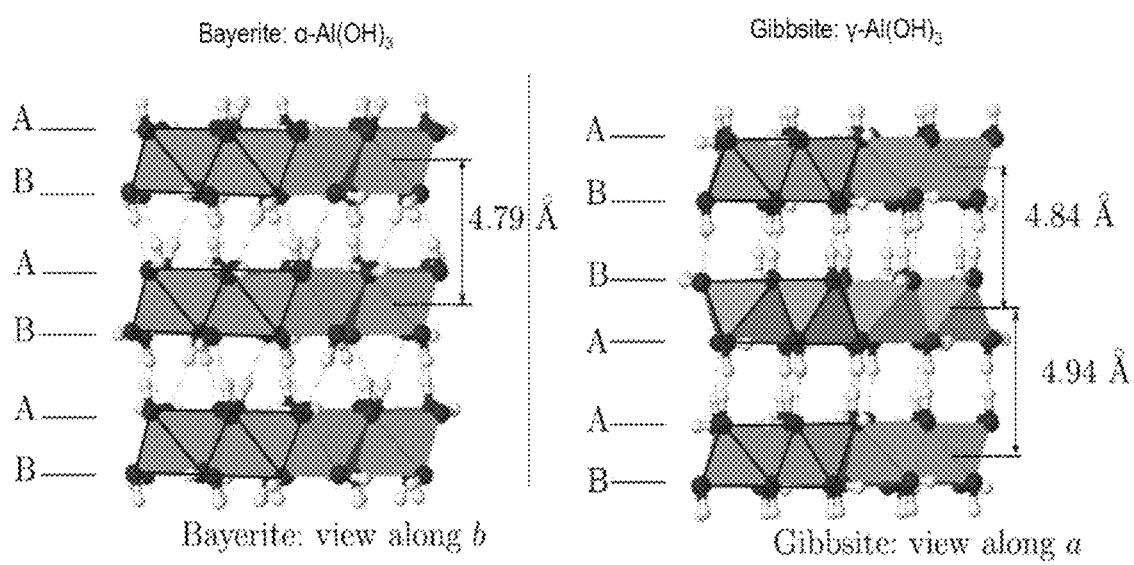

[FIG. 2]
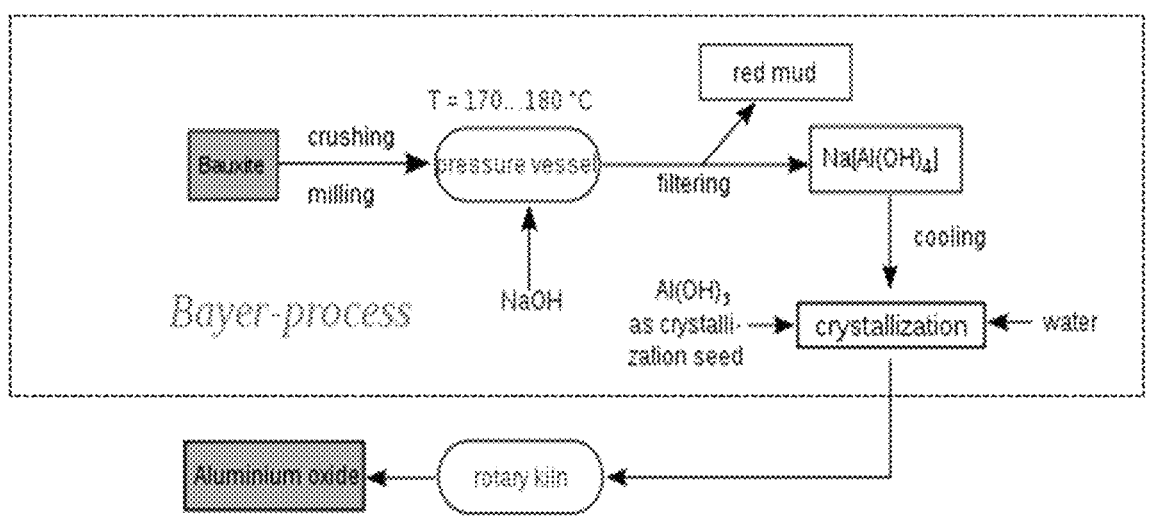

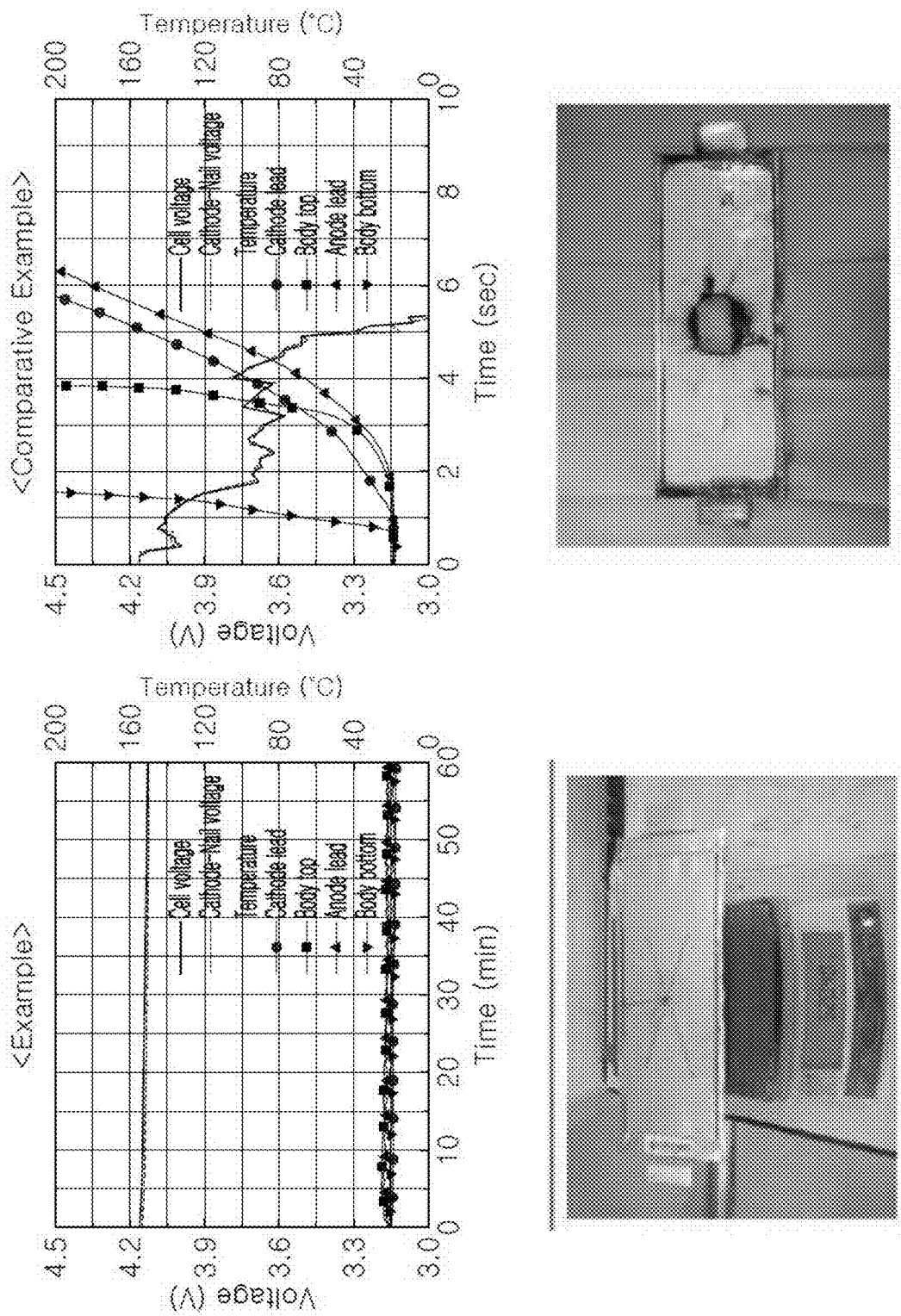
[FIG. 3]

[FIG. 4]
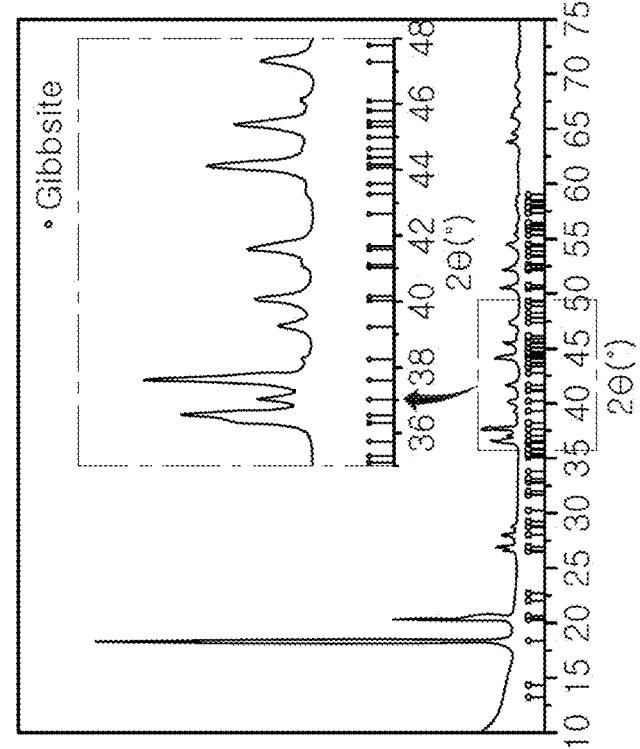
<Comparative Example>
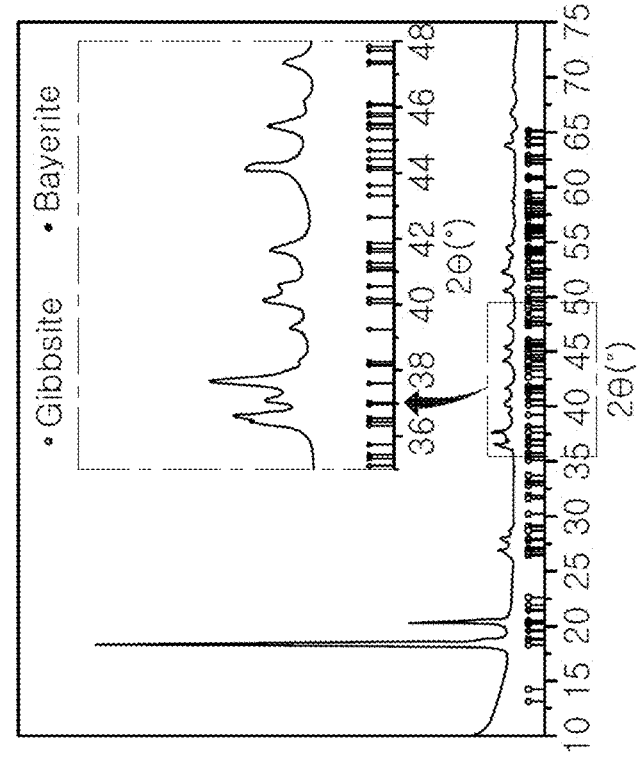
<Example>

FLAME RETARDANT SEPARATOR FOR SECONDARY BATTERY

TECHNICAL FIELD

This application claims priority to and the benefit of Korean Patent Application No. 2018-0054550 filed on May 11, 2018, the disclosure of which is hereby incorporated by reference herein in its entirety.

The present invention relates to a flame retardant separator for secondary batteries, and more particularly to a flame retardant separator for secondary batteries comprising or coated with a metal hydroxide having a low Gibbs free energy among polymorphs of a metal hydroxide used as an inorganic flame retardant.

BACKGROUND ART

With the trends toward reducing the weight and increasing the functionality of portable devices, such as smartphones, laptop computers, tablet PCs, and portable game machines, the demand for a secondary battery serving as a driving power source thereof is increasing. In the past, nickel-cadmium, nickel-hydrogen, and nickel-zinc batteries have been used, but lithium secondary batteries, which have high operating voltage and high energy density per unit weight, are most frequently used at present.

With the growth of markets related to the portable device market, the demand for lithium secondary batteries has increased. Lithium secondary batteries have also come to be used as the power sources for electric vehicles (EV), hybrid electric vehicles (HEV) and storage of renewable energy.

A lithium secondary battery is configured such that an electrode assembly having a positive electrode/separator/negative electrode structure, which can be charged and discharged, is mounted in a battery case. Each of the positive electrode and the negative electrode is manufactured by applying a slurry including an electrode active material to one surface or both surfaces of a metal current collector, drying the slurry, and rolling the metal current collector having the dried slurry applied thereto.

The separator is one of the most important factors that affect the performance and the lifespan of a secondary battery. It is necessary for the separator to electrically isolate the positive electrode and the negative electrode from each other and to exhibit ion permeability and mechanical strength such that an electrolytic solution can pass smoothly through the separator. In addition, as the applications of high-energy lithium secondary batteries are expanded, safety of the separator at high temperature is also needed.

A hydroxide-based inorganic flame retardant is a flame retardant that absorbs heat at a certain temperature and are used in resins and the like. The hydroxide-based inorganic flame retardant was used in various ways to enhance the flame retardancy of a secondary battery.

Patent Document 1 relates to a lithium secondary battery with enhanced heat-resistance and discloses an electrode whose surface includes an organic/inorganic composite porous coating layer comprising heat-absorbing inorganic particles and a binder polymer. The kind of heat-absorbing inorganic particles is at least one particle selected from the group consisting of antimony-containing compounds, metal hydroxides, guanidine-based compounds, boron-containing compounds and zinc tartrate compounds. The heat-absorbing inorganic particles are used as a component for forming or coating a separator.

Patent Document 2 relates to an electrode assembly with an asymmetrically coated separator and an electrochemical device comprising the same. The electrode assembly of Patent Document 2 is characterized that it is composed by alternatively laminating a plurality of: anode units comprising an anode collector, anode active material layers coated on both sides of the anode collector, and a separator attached to one side of the anode collector; and cathode units comprising an cathode collector, cathode active material layers coated on both sides of the cathode collector, and a separator attached to one side of the cathode collector, and the separator is asymmetrically coated, wherein one side thereof, attached to each active material in the anode unit or the cathode unit, and the other side thereof are asymmetrically coated with an adhesive-power reinforcing member and a heat-resistance reinforcing member, respectively. Patent Document 2 discloses that a hydroxide inorganic flame retardant may be asymmetrically coated only on the anode or the cathode.

Patent Document 3 relates to a separator for a non-aqueous electrolyte secondary battery, which comprises a laminate in which at least two layers are laminated, of which, at least one has a shutdown temperature of 140° C. or less, and at least one layer has a heat deformation temperature (JIS K 7207A method) of 100° C. or more, with an oxygen index (JIS K 7201) of a layer facing a positive electrode of 26 or more.

In Patent Document 3, a layer facing a negative electrode is made of a material mainly composed of polyolefin, and the layer facing the positive electrode is made of fluorine-based resin, an inorganic compound and a flame retardant.

As described above, various flame retardants are used in order to enhance the safety of lithium secondary batteries. However, the inventors of the present invention have observed that the flame retardancy properties are non-uniform even though the flame retardants are represented by the same chemical formula. Such non-uniform flame retardant properties have a problem that the flame retardant properties are not exhibited even though the flame retardants are added as a component of the separator. In the related art, it has been found that such non-uniform flame retardant properties are not recognized as a problem, and a solution to this problem has not been suggested.

RELATED ART DOCUMENT

Patent Document

Korean Registered Patent Publication No. 0833038
Korean Patent Application Publication No. 2012-0079515
Japanese Patent Application Publication No. 2006-269359

DISCLOSURE

Technical Problem

The present invention has been made in view of the above problems, and it is an object of the present invention to solve the problems that the flame retardant properties are non-uniform even though the flame retardants are represented by the same chemical formula. It is another object of the present invention to provide a separator for secondary batteries comprising a flame retardant which is capable of always exhibiting flame retardant properties by solving the above problems, and a secondary battery comprising the same.

Technical Solution

In a first aspect of the present invention, the above and other objects can be accomplished by the provision of a separator for secondary batteries comprising a flame retardant inorganic material which can exist in a stable form and a metastable form, wherein the separator comprises a first flame retardant inorganic material in a metastable form and optionally comprises a second flame retardant inorganic material in a stable form.

In a second aspect of the present invention, there is provided a secondary battery comprising the separator.

The first flame retardant inorganic material is a metal hydroxide or a metal hydrate, particularly at least one of aluminum hydroxide (Al(OH)$_3$), magnesium hydroxide (Mg(OH)$_2$), aluminum oxyhydroxide (AlOOH), and CaO·Al$_2$O$_3$·6H$_2$O.

The second flame retardant inorganic material in the stable form is gibbsite, and the first flame retardant inorganic material in the metastable form is at least one of bayerite, doyleite, and nordstrandite.

In addition to the flame retardant inorganic material, the separator may further comprise inorganic particles which are high-dielectric inorganic particles having a dielectric constant of 1 or higher, inorganic particles having piezoelectricity, inorganic particles having lithium ion transfer ability, or a mixture of two or more thereof. Particularly, the inorganic particles may comprise at least one selected from a group consisting of Al$_2$O$_3$, SiO$_2$, MgO, TiO$_2$ and BaTiO$_2$.

A binder material used for the separator is at least one selected from the group consisting of polyvinylidene fluoride (PVdF), polyvinylidene fluoride-hexafluoropropylene, polyvinyl pyrrolidone, polyacrylonitrile, polyvinylidene fluoride-trichloroethylene, polyvinylidene fluoride-chlorotrifluoroethylene (PVdF-CTFE), polymethyl methacrylate, polyvinyl acetate, ethylene-co-vinyl acetate copolymer, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxymethyl cellulose, acrylonitrile butadiene styrene copolymer, polyimide, polyacrylonitrile-styrene copolymer, gelatin, polyethylene glycol, polyethylene glycol dimethyl ether, ethylene-propylene-diene terpolymer (EPDM), sulfonated EPDM, styrene butadiene rubber (SBR), tetrafluoroethylene (TFE), and fluoro rubber. Particularly, the binder material is at least one selected from a group consisting of PVdF, TFE, and polyimide.

The separator may be an organic/inorganic composite porous separator using a mixture of inorganic particles and a binder polymer and having no polyolefin substrate, or a separator having an organic/inorganic composite porous coating layer in which a mixture of inorganic particles and a binder polymer is coated on a surface of a porous polyolefin substrate and/or on pores in a substrate. The separator may be such that the flame retardant inorganic material is dispersed over the entire separator or coated on a part of the surface.

BRIEF DESCRIPTION OF DRAWINGS

FIG. 1 shows a crystal structure of gibbsite and bayerite of aluminum hydroxide.
FIG. 2 is a process flowchart of Bayer process.
FIG. 3 shows graphs and photographs showing the results of the safety measurement of Example 1 and Comparative Example 1.
FIG. 4 shows XRD measurement results of the metal hydroxide according to Example 1 and Comparative Example 1.

BEST MODE

Hereinafter, the present invention will be described in detail. It should be noted that terms or words used in this specification and the claims are not to be interpreted as having ordinary and dictionary-based meanings but as having meanings and concepts coinciding with the technical idea of the present invention based on the principle that the inventors may properly define the concepts of the terms in order to explain the invention in the best method. Consequently, the embodiments described in this specification are merely the most preferred embodiments and do not cover all technical ideas of the present invention, and therefore it should be understood that there may be various equivalents and modifications capable of substituting for the embodiments at the time of filing of the present application.

In accordance with an aspect of the present invention, there is provided a separator for secondary batteries comprising a flame retardant inorganic material which can exist in a stable form and a metastable form, wherein the separator always comprises the flame retardant inorganic material in the metastable form.

1) Flame Retardant Inorganic Material

The flame retardant inorganic material according to the present invention is at least one selected from a group consisting of an antimony-containing compound, a metal hydroxide or a metal hydrate, a guanidine-based compound, a boron-containing compound, and zinc stannate.

The antimony-containing compound is selected from among antimony trioxide (Sb$_2$O$_3$), antimony tetroxide (Sb$_2$O$_4$) and antimony pentoxide (Sb$_2$O); the metal hydroxide or the metal hydrate is selected from among aluminum hydroxide (Al(OH)$_3$), magnesium hydroxide (Mg(OH)$_2$), aluminum hydroxide oxide (AlO(OH)) and CaO.Al$_2$O$_3$.6H$_2$O; the guanidine-based compound is selected from a group consisting of nitrogenated guanidine, guanidine sulfamate, guanidine phosphate, and guanylurea phosphate; the boron-containing compound is H$_3$BO$_3$ or HBO$_2$; and the zinc stannate compound is selected from among Zn$_2$SnO$_4$, ZnSnO$_3$, and ZnSn(OH)$_6$.

Preferably, the flame retardant inorganic material is at least one selected from among aluminum hydroxide (Al(OH)$_3$), magnesium hydroxide (Mg(OH)$_2$), aluminum hydroxide oxide (AlO(OH)), and CaO.Al$_2$O$_3$.6H$_2$O, and more preferably, the flame retardant inorganic material is aluminum hydroxide (Al(OH)$_3$).

The Al(OH)$_3$, Mg(OH)$_2$, and 3CaO.Al$_2$O$_3$.6H$_2$O act as a flame retardant represented by the following chemical formulas.

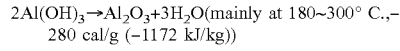

2Al(OH)$_3$→Al$_2$O$_3$+3H$_2$O(mainly at 180~300° C.,−280 cal/g (−1172 kJ/kg))

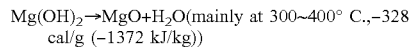

Mg(OH)$_2$→MgO+H$_2$O(mainly at 300~400° C.,−328 cal/g (−1372 kJ/kg))

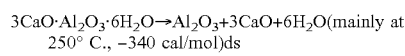

3CaO·Al$_2$O$_3$·6H$_2$O→Al$_2$O$_3$+3CaO+6H$_2$O(mainly at 250° C., −340 cal/mol)ds When the flame retardant inorganic material is aluminum hydroxide (Al(OH)$_3$), the flame retardant inorganic material in the stable form is gibbsite, and the flame retardant inorganic material in the metastable form is at least one of bayerite, doyleite, and nordstrandite.

Specific crystal structures of gibbsite and bayerite are shown in FIG. 1, and the following table shows the comparison of hydrogen bond distances of gibbsite and bayerite.

| Phase | Bayerite (α-ATH) | Gibbsite (γ-ATH) |
|---|---|---|
| Inter-layer hydrogen bond distance (Å) | 2.0167 | 1.8730 |
| Intra-layer hydrogen bond distance (Å) | 2.2175 | 2.1981 |
| Hydrogen bonding energy (KJ/mol) | 17.59 | 23.15 |

Chemical Physics Letter, 2008, 465, 220

When a metal hydroxide or metal hydrate causes a phase transition from a liquid state to a metal state, various polymorphs can be formed depending on the rate of phase transition and the type of solvent. Each polymorph is different in Gibbs free energy and defines a polymorph with the lowest Gibbs free energy as a stable form. Since Gibbs free energy is the same as that defined in thermodynamics, a detailed description thereof will be omitted.

The unstable form with high Gibbs free energy exhibits flame retardant properties by reacting at low temperature in contrast with a stable form. In addition, when the stable form and the unstable form are present at the same time, it is inferred that the reaction first initiated by the unstable form leads to the entire form of reaction. That is, when the unstable form is present together, it is inferred that the starting temperature of the dehydration reaction of the stable form is accelerated.

As the temperature increases, the metal hydroxide among the flame retardant inorganic materials according to the present invention decomposes while the dehydration reaction, which is an endothermic reaction, takes place. At this time, a flame retardant effect is shown by the endothermic reaction and the water generated. In the case of applying $Al(OH)_3$, which is one embodiment of the present invention, no flame retardant effect was observed when a nail penetration test was performed in the case where the flame retardant inorganic material existed only in the form of gibbsite; and a flame retardant effect was observed when a nail penetration test was performed in the case where the flame retardant inorganic material existed in the form of bayerite and etc., the metastable form.

In the case in which the flame retardant inorganic material exists only in the form of gibbsite, it is interpreted that the reaction proceeds at 180° C. or higher. In the case in which the flame retardant inorganic material has some metastable form, it is interpreted that the reaction proceeds even at 150° C.

The flame retardant properties of a metal hydroxide according to the polymorphic form have not been recognized as a problem at all. The inventors of the present invention have made painstaking efforts to solve the non-uniform flame retardant properties that appear intermittently. As a result, they have recognized that non-uniform flame retardant properties are exhibited due to the above-mentioned problems, and they provided the present invention which solved the problems.

In order to determine the form and distribution of polymorphic form, XRD Bruker AXS D4 Endeavor XRD, 40 kV, 40 mA, Cu Kα radiation (wavelength 1.54 Å) was used. The relative quantitative ratio of each form was calculated by taking the sum of the peaks as 100 on the XRD.

The flame retardant inorganic material in the metastable form is 2 wt % or more, preferably 5 wt % or more, of the total flame retardant inorganic material. In addition, the flame retardant inorganic material may exist asymmetrically on only one of surfaces facing a positive electrode and a negative electrode of the separator. This is because water, which is a product of the decomposition reaction of a metal hydroxide of the flame retardant inorganic material, may cause an additional reaction with lithium of an electrode.

The bauxite ore is a mixture of compounds of hydrated aluminum oxide and other elements such as iron. The Bayer process, which is a kind of a method of smelting metallic aluminum using bauxite as a raw material, is shown in FIG. 2.

Referring to FIG. 2, the bauxite ore is heated in a pressure vessel together with sodium hydroxide solution at 150° C. to 200° C. At this temperature, aluminum is dissolved as sodium aluminate ($2NaAlO_2$) in the extraction process. The aluminum compound of the bauxite may be present as gibbsite ($Al(OH)_3$), boehmite (γ-AlO(OH)) or diaspore (α-AlO(OH)) and different forms of the aluminum component are determined by different extraction conditions. After separating the residue by filtration, gibbsite (aluminum hydroxide) precipitates and is seeded with fine aluminum hydroxide when the liquid is cooled down.

The extraction process converts the aluminum oxide of the ore into soluble sodium aluminate $2NaAlO_2$ according to the following chemical reaction formula.

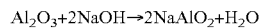

This treatment dissolves the silica but does not dissolve the other components of the bauxite. Sometimes lime is added at this stage to precipitate the silica into calcium silicate. In order to remove particulates, the solution is generally filtered to purify the solid impurities using a flocculant such as a rotary sand trap and starch. The undissolved waste after the aluminum compound is extracted contains iron oxide, silica, calcia, titania and some unreacted alumina. The original process is to cool the alkaline solution to treat carbon dioxide by bubbling through it and the aluminum hydroxide is precipitated in this way.

The original process is to cool the alkaline solution to bubbling carbon dioxide through it and the aluminum hydroxide precipitates in this way.

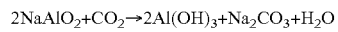

2) Separator

The separator for secondary batteries according to the present invention may be an organic/inorganic composite porous separator using a mixture of inorganic particles and a binder polymer and having no polyolefin substrate, or may be a separator having an organic/inorganic composite porous coating layer, in which a mixture of inorganic particles and a binder polymer is coated on a surface of porous polyolefin substrate and/or on pores in a substrate, wherein the flame retardant inorganic material may be dispersed over the entire surface of the separator or may be coated a part of the surface.

In a lithium secondary battery, precipitation of lithium ions mainly occurs in a negative electrode, the flame retardant effect can be achieved by coating of a hydroxide-based inorganic flame retardant capable of generating moisture only on a surface of separator facing a positive electrode, whereby it is possible to prevent reaction between the precipitated lithium and moisture.

Then, a binder for forming an adhesive layer or a conventional alumina-based SRS may be coated on a surface of separator facing a negative electrode, which is the opposite side. In order to enhance the flame retardant effect, however, it is effective to have such that the thickness of coating on the surface facing the positive electrode is greater than the thickness of coating on the surface facing the negative electrode.

The overall thickness of the separator according to the present invention is similar to that of a conventional separator coated with an inorganic material on surfaces facing a positive electrode and a negative electrode. The thickness of the separator may range from 5 µm to 30 µm. In the case in which the thickness of the separator is less than 5 µm, the strength of the separator is low, whereby the separator may be easily damaged, which is undesirable. In the case in which the thickness of the separator is greater than 30 µm, the overall thickness of the electrode assembly is increased, whereby the capacity of the battery may be reduced, which is also undesirable.

The charge and discharge characteristics of a battery including the separator according to the present invention at 35° C. or more and 50° C. or less are identical to those of a battery including the conventional separator having both surfaces coated with the inorganic material. In the case in which the temperature is 35° C. or less, the effect based on the temperature cannot be distinguished. In the case in which the temperature is 50° C. or more, the conventional separator having both surfaces coated with the inorganic material has inferior thermal stability to the separator according to the present invention.

3) Inorganic Particles

Inorganic particles used in the separator according to the present invention are added separately from the flame retardant inorganic material. The inorganic particles may form empty spaces among the inorganic particles, and thereby may form micro pores and maintain a physical shape as a spacer. The physical characteristics of the inorganic particles are not generally changed at a temperature of 200° C. or more.

The inorganic particles are not particularly restricted, as long as the inorganic particles are electrochemically stable. In other words, the inorganic particles that may be used in the present invention are not particularly restricted as long as the inorganic particles are not oxidized and/or reduced within the operating voltage range (e.g. 0 to 5 V based on Li/Li$^+$) of a battery to which the inorganic particles are applied. Particularly, in the case in which inorganic particles having high electrolyte ion transfer ability are used, it is possible to improve the performance of an electrochemical device. Consequently, it is preferable for the electrolyte ion transfer ability of the inorganic particles to be as high as possible. In addition, in the case in which the inorganic particles have high density, it may be difficult to disperse the inorganic particles at the time of forming the porous separator, and the weight of a battery may increase at the time of manufacturing the battery. For these reasons, it is preferable for the density of the inorganic particles to be low. In addition, in the case in which the inorganic particles have high permittivity, the degree of dissociation of electrolyte salt, such as lithium salt, in a liquid electrolyte may increase, thereby improving the ion conductivity of the electrolytic solution.

For the reasons described above, the inorganic particles may be high-dielectric inorganic particles having a dielectric constant of 1 or more, preferably 10 or more, inorganic particles having piezoelectricity, inorganic particles having lithium ion transfer ability, or a mixture of two or more thereof.

Examples of the inorganic particles having a dielectric constant of 1 or more may include $SrTiO_3$, $SnO_2$, $CeO_2$, MgO, NiO, CaO, ZnO, $ZrO_2$, $Y_2O_3$, $Al_2O_3$, $TiO_2$, SiC, or a mixture thereof. However, the present invention is not limited thereto.

The inorganic particles having piezoelectricity are a material that is a nonconductor at normal pressure but, when a predetermined pressure is applied thereto, exhibits conductivity due to a change in the internal structure thereof. In the case in which the inorganic particles have a high dielectric value, e.g. a dielectric constant of 100 or more, and the inorganic particles are tensioned or compressed with a predetermined pressure, electric charges are generated. One face is charged as a positive pole and the other face is charged as a negative pole, whereby a potential difference is generated between these faces.

In the case in which inorganic particles having the above-mentioned characteristics are used, a short circuit may occur in both electrodes in the event of an external impact, such as local crushing or an impact with a nail. At this time, however, the positive electrode and the negative electrode may not directly contact each other due to the inorganic particles coated on the porous separator, and potential differences in particles may occur due to the piezoelectricity of the inorganic particles. Accordingly, electron migration, namely, fine current flow, is achieved between the two electrodes, whereby the voltage of the battery is gradually reduced, and therefore the stability of the battery may be improved.

Examples of the inorganic particles having piezoelectricity may include $BaTiO_3$, $Pb(Zr, Ti)O_3$ (PZT), $Pb_{1-x}La_xZr_{1-y}Ti_yO_3$ (PLZT), $Pb(Mg_{1/3}Nb_{2/3})O_3$—$PbTiO_3$ (PMN-PT) hafnia ($HfO_2$), and a mixture thereof. However, the present invention is not limited thereto.

The inorganic particles having lithium ion transfer ability are inorganic particles that contain lithium elements and transport lithium ions without storing lithium. The inorganic particles having lithium ion transfer ability may transfer and transport lithium ions due to a kind of defect present in a particle structure. Consequently, lithium ionic conductivity in the battery may be improved, and therefore the battery performance may be improved.

Examples of the inorganic particles having lithium ion transfer ability may include lithium phosphate ($Li_3PO_4$), lithium titanium phosphate ($Li_xTi_y(PO_4)_3$, where $0<x<2$ and $0<y<3$), lithium aluminum titanium phosphate ($Li_xAl_yTi_z(PO_4)_3$, where $0<x<2$, $0<y<1$, and $0<z<3$), $(LiAlTiP)_xO_y$-based glass (where $0<x<4$ and $0<y<13$) such as $14Li_2O$-$9Al_2O_3$-$38TiO_2$-$39P_2O_5$, lithium lanthanum titanate ($Li_xLa_yTiO_3$, where $0<x<2$ and $0<y<3$), lithium germanium thiophosphate ($Li_xGe_yP_zSW$, where $0<x<4$, $0<y<1$, $0<z<1$, and $0<w<5$) such as $Li_{3.25}Ge_{0.25}P_{0.73}S_4$, lithium nitride ($Li_xN_y$, where $0<x<4$ and $0<y<2$) such as $Li_3N$, $SiS_2$-based glass ($Li_xSi_yS_z$, where $0<x<3$, $0<y<2$, and $0<z<4$) such as $Li_3PO_4$—$Li_2S$—$SiS_2$, $P_2S_5$-based glass ($Li_xP_yS_z$, where $0<x<3$, $0<y<3$, and $0<z<7$) such as $LiI$—$Li_2S$—$P_2S_5$, and a mixture thereof. However, the present invention is not limited thereto.

In the case in which the inorganic particles having high permittivity, the inorganic particles having piezoelectricity, and the inorganic particles having lithium ion transfer ability are used together, the effects obtained through these ingredients may be further improved.

The size of each of the inorganic particles is not particularly restricted. In order to form a film having a uniform thickness and to achieve appropriate porosity, however, each of the inorganic particles may have a size of 0.001 µm to 10

μm. In the case in which the size of each of the inorganic particles is less than 0.001 μm, dispersibility is reduced, whereby it is difficult to adjust the physical properties of the porous separator. In the case in which the size of each of the inorganic particles is greater than 10 μm, the thickness of a separator manufactured with the same content of a solid body is increased, whereby the mechanical properties of the separator are deteriorated. In addition, a short circuit may easily occur in the battery when the battery is charged and discharged due to excessively large-sized pores.

1) Binder

The binder may also be commonly referred to as a polymer binder and may become a gel when the binder is impregnated with a liquid electrolytic solution, whereby the binder may have a characteristic of exhibiting high rate of electrolytic solution impregnation. In fact, in the case in which the polymer binder is a polymer having a high rate of electrolytic solution impregnation, an electrolytic solution injected after the assembly of a battery permeates into the polymer, and the polymer impregnated with the electrolytic solution exhibits electrolyte ion transfer ability. In addition, compared to a conventional hydrophobic polyolefin-based separator, wetting of the porous separator in the electrolytic solution may be improved, and it is possible to use polar electrolytic solutions for batteries, which has been difficult conventionally. Consequently, the binder may have a polymer with solubility parameter of 15 $MPa^{1/2}$ to 45 $MPa^{1/2}$, preferably 15 $MPa^{1/2}$ to 25 $MPa^{1/2}$ and 30 $MPa^{1/2}$ to 45 $MPa^{1/2}$. In the case in which the solubility parameter of the binder is less than 15 $MPa^{1/2}$ and greater than 45 $MPa^{1/2}$, it is difficult to impregnate the binder with a conventional electrolytic solution for batteries.

Specifically, the binder may be at least one selected from the group consisting of polyvinylidene fluoride (PVdF), polyvinylidene fluoride-hexafluoropropylene, polyvinyl pyrrolidone, polyacrylonitrile, polyvinylidene fluoride-trichloroethylene, polyvinylidene fluoride-chlorotrifluoroethylene (PVdF-CTFE), polymethyl methacrylate, polyvinyl acetate, ethylene-co-vinyl acetate copolymer, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxymethyl cellulose, acrylonitrile butadiene styrene copolymer, polyimide, polyacrylonitrile-styrene copolymer, gelatin, polyethylene glycol, polyethylene glycol dimethyl ether, ethylene-propylene-diene terpolymer (EPDM), sulfonated EPDM, styrene butadiene rubber (SBR), tetrafluoroethylene (TFE), and fluoro rubber. Preferably, the binder may be at least one selected from the group consisting of PVdF, TFE and polyimide.

The binder material may further comprise at least one selected from among baicalin, luteolin, taxifolin, myricetin, quercetin, rutin, catechin, epigallocatechin gallate, butein, piceatannol, a phenolic-based compound comprising tannic acid, pyrogallic acid, amylose, amylopectin, xanthan gum, an aqueous or non-aqueous polymer consisting of fatty acid system. Such a binder material includes a large amount of OH groups, thereby enhancing the adhesive strength of the binder-inorganic material and the substrate-binder. At the same time, it may prevent a short circuit in a battery through self-healing function against partial damage to the separator, improve the adhesion between the separator and the positive electrode and between the separator and the negative electrode, and cope with elution of the positive electrode material transition metal.

The content of the binder may comprise 5 to 45 percent of a weight of the inorganic particles, preferably 10 to 40 percent of a weight of the inorganic particles.

5) Solvent

A solvent for manufacturing the separator according to the present invention may be used any conventional solvent known in the art without limitation, preferably acetone, tetrahydrofuran, acetonitrile, dimethylformamide, dimethyl sulfoxide, dimethylacetamide, N-Methylpyrrole, or water may be used, or a mixture of two or more thereof may be used.

The solvent may comprise 60 to 85 percent of a weight of a slurry composition for coating of the separator. The content ratio (weight %) of the inorganic material to the binder is 60 to 90:40 to 10.

6) Construction and Application of Electrode Assembly

The present invention also provides an electrochemical device including a positive electrode, a negative electrode, the separator interposed between the positive electrode and the negative electrode, and an electrolyte. Here, the electrochemical device may be a lithium secondary battery.

The positive electrode may be manufactured by applying a mixture of a positive electrode active material, a conductive agent, and a binder to a positive electrode current collector and drying the mixture. A filler may be further added to the mixture as needed.

In general, the positive electrode current collector is manufactured so as to have a thickness of 3 to 500 μm. The positive electrode current collector is not particularly restricted, as long as the positive electrode current collector exhibits high conductivity while the positive electrode current collector does not induce any chemical change in a battery to which the positive electrode current collector is applied. For example, the positive electrode current collector may include stainless steel, aluminum, nickel, titanium, or plastic carbon. Alternatively, the positive electrode current collector may include aluminum or stainless steel, the surface of which is treated with carbon, nickel, titanium, or silver. In addition, the positive electrode current collector may have a micro-scale uneven pattern formed on the surface thereof so as to increase the force of adhesion of the positive electrode active material. The positive electrode current collector may be configured in various forms, such as those of a film, a sheet, a foil, a net, a porous body, a foam body, and a non-woven fabric body.

The positive electrode active material may be, but is not limited to, a layered compound, such as a lithium cobalt oxide ($LiCoO_2$) or a lithium nickel oxide ($LiNiO_2$), or a compound substituted with one or more transition metals; a lithium manganese oxide represented by the chemical formula $Li_{1+x}Mn_{2-x}O_4$ (where x=0 to 0.33) or a lithium manganese oxide, such as $LiMnO_3$, $LiMn_2O_3$, or $LiMnO_2$; a lithium copper oxide ($Li_2CuO_2$); a vanadium oxide, such as $LiV_3O_8$, $V_2O_3$, or $Cu_2V_2O_7$; an Ni-sited lithium nickel oxide represented by the chemical formula $LiNi_{1-x}M_xO_2$ (where M=Co, Mn, Al, Cu, Fe, Mg, B, or Ga, and x=0.01 to 0.3); a lithium manganese composite oxide represented by the chemical formula $LiMn_{2-x}M_xO_2$ (where M=Co, Ni, Fe, Cr, Zn, or Ta, and x=0.01 to 0.1) or the chemical formula $Li_2Mn_3MO_8$ (where M=Fe, Co, Ni, Cu, or Zn); $LiMn_2O_4$ having Li of a chemical formula partially replaced by alkaline earth metal ions; a disulfide compound; or $Fe_2(MoO_4)_3$.

The conductive agent is generally added in an amount of 1 to 30 wt % based on the total weight of the compound including the positive electrode active material. The conductive agent is not particularly restricted, as long as the conductive agent exhibits high conductivity without inducing any chemical change in a battery to which the conductive agent is applied. For example, graphite, such as natural graphite or artificial graphite; carbon black, such as carbon black, acetylene black, Ketjen black, channel black, furnace black, lamp black, or summer black; conductive fiber, such as carbon fiber or metallic fiber; metallic powder, such as carbon fluoride powder, aluminum powder, or nickel powder; conductive whisker, such as a zinc oxide or potassium titanate; a conductive metal oxide, such as a titanium oxide; or conductive materials, such as polyphenylene derivatives, may be used as the conductive agent.

The binder is a component assisting in binding between the active material and the conductive agent and in binding with the current collector. The binder is generally added in an amount of 1 to 30 wt % based on the total weight of the compound including the positive electrode active material. As examples of the binder, there may be used polyvinylidene fluoride, polyvinyl alcohol, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluoro rubber, and various copolymers.

The filler is an optional component used to inhibit expansion of the positive electrode. There is no particular limit to the filler, as long as it does not cause any chemical change in a battery to which the filler is applied and is made of a fibrous material. As examples of the filler, there may be used olefin polymers, such as polyethylene and polypropylene; and fibrous materials, such as glass fiber and carbon fiber.

The negative electrode may be manufactured by applying a negative electrode material to a negative electrode current collector and drying the same. The above-described components may be selectively further included as needed.

In general, the negative electrode current collector is manufactured so as to have a thickness of 3 μm to 500 μm. The negative electrode current collector is not particularly restricted, as long as the negative electrode current collector exhibits high conductivity while the negative electrode current collector does not induce any chemical change in a battery to which the negative electrode current collector is applied. For example, the negative electrode current collector may include copper, stainless steel, aluminum, nickel, titanium, or plastic carbon. Alternatively, the negative electrode current collector may include copper or stainless steel, the surface of which is treated with carbon, nickel, titanium, or silver, or an aluminum-cadmium alloy. In addition, the negative electrode current collector may have a micro-scale uneven pattern formed on the surface thereof so as to increase the force of adhesion of the negative electrode active material, in the same manner as the positive electrode current collector. The negative electrode current collector may be configured in various forms, such as those of a film, a sheet, a foil, a net, a porous body, a foam body, and a non-woven fabric body.

As the negative electrode active material, for example, there may be used carbon, such as a hard carbon or a graphite-based carbon; a metal composite oxide, such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, Group 1, 2 and 3 elements of the periodic table, halogen; $0 \leq x \leq 1$; $1 \leq y \leq 3$; $1 \leq z \leq 8$); lithium metal; lithium alloy; silicon-based alloy; tin-based alloy; a metal oxide, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, or $Bi_2O_3$; a conductive polymer, such as polyacetylene; or a Li—Co—Ni based material.

In accordance with another aspect of the present invention, there is provided a battery pack including the electrochemical device.

Particularly, the battery pack may be used as a power source for a device requiring the ability to withstand high temperatures, a long lifespan, high rate characteristics, etc. Specific examples of the device may include a mobile electronic device, a wearable electronic device, a power tool driven by a battery-powered motor; an electric automobile, such as an electric vehicle (EV), a hybrid electric vehicle (HEV), or a plug-in hybrid electric vehicle (PHEV); an electric two-wheeled vehicle, such as an electric bicycle (E-bike) or an electric scooter (E-scooter); an electric golf cart; and an energy storage system. However, the present invention is not limited thereto.

The structure and manufacturing method of the device are well known in the art to which the present invention pertains, and a detailed description thereof will be omitted.

Hereinafter, the present invention will be described in detail with reference to the following examples and experimental examples; however, the present invention is not limited by the examples and the experimental examples. The examples may be modified into various other forms, and the scope of the present invention should not be interpreted as being limited by the examples, which will be described in detail. The examples are provided in order to more completely explain the prevent invention to a person who has average knowledge in the art to which the present invention pertains.

Example 1

$Al(OH)_3$ containing 95 wt % of gibbsite and 5 wt % of bayerite as the flame retardant inorganic material, polyvinylidene fluoride-hexafluoropropylene as the binder polymer, and alumina as the inorganic particles were mixed and dispersed to prepare a slurry.

The slurry was coated on a separator substrate and dried to complete a separator.

Comparative Example 1

A separator was manufactured using the same method as in Example 1, except that only gibbsite was used as the flame retardant inorganic material without bayerite in Example 1.

<Measurement of Safety of Battery Including Separator—Nail Penetration Test>

Batteries were manufactured using the separators according to Comparative Example 1 and Example 1, and then nail penetration tests were performed on the batteries. FIG. 3 provides graphs showing the changes in voltage and temperature over time and photographs of the test result.

The nail diameter was 3 mm, the slope was 30 degree, and the speed through the nail was 80 mm/sec.

Referring to FIG. 3, in the case of Comparative Example 1, the surface temperature of the battery rose sharply, indicating that the safety of the battery was very poor. On the other hand, in Example 1 according to the present invention, it was confirmed that the Example 1 showed excellent flame retardant performance by maintaining the surface temperature of the battery at 20° C. As a result of disassembling each battery, it was observed that all of the inner substrate was melted and the pores of the substrate itself were all gone.

Therefore, it can be assumed that the internal temperature of Example 1 also rose to 135° C. or more, which is the melting point of separator substrate. Nevertheless, it has been confirmed that the battery with the flame retardant added according to the present invention was very stable even for very serious damage such as nail penetration by maintaining the external temperature very stable.

<XRD Measurement of Metal Hydroxide>

In order to analyze the structure of the metal hydroxide used in Example 1 and Comparative Example 1, XRD measurement was performed and the results are shown in FIG. 4.

Referring to FIG. 4, the aluminum hydroxide using in Example 1 was analyzed to contain a gibbsite phase and a bayerite phase. It can be seen that the aluminum hydroxide used in Comparative Example 1 contained only gibbsite.

That is, as shown in the safety test result of Example 1, it can be seen that safety is improved in the case in which both gibbsite and bayerite are included.

INDUSTRIAL APPLICABILITY

A separator for secondary batteries according to the present invention is advantageous in that 1) the flame retardant property is always exhibited, and 2) similar electrochemical properties can be maintained compared to conventional inorganic coating separators.

The invention claimed is:

1. A separator for secondary batteries comprising:
wherein the separator for secondary batteries comprises flame retardant inorganic material, wherein the flame retardant inorganic material comprises a first flame retardant inorganic material in a metastable form and a second flame retardant inorganic material in a stable form,
wherein the second flame retardant inorganic material is present in the stable form of gibbsite, and the first flame retardant inorganic material in the metastable form is bayerite, and
wherein the first flame retardant inorganic material in the metastable form is 5 wt % of an entire content of flame retardant inorganic material.

2. The separator for secondary batteries according to claim 1,
wherein the first flame retardant inorganic material is asymmetrically present on one surface of a polyolefin substrate facing either a positive electrode or a negative electrode.

3. The separator for secondary batteries according to claim 1,
wherein the separator for secondary batteries is an organic/inorganic composite porous separator comprising a mixture of inorganic particles and a binder polymer and comprising no polyolefin substrate, or
the separator comprises an organic/inorganic composite porous coating layer comprising a mixture of inorganic particles and a binder polymer coated on a surface of a porous polyolefin substrate and/or on pores in the porous polyolefin substrate,
wherein the flame retardant inorganic material is dispersed over the entire separator or coated on a part of the surface of the separator.

4. The separator for secondary batteries according to claim 3,
wherein the inorganic particles are added separately from the flame retardant inorganic material and the inorganic particles are high-dielectric inorganic particles having a dielectric constant of 1 or higher, inorganic particles having piezoelectricity, inorganic particles having lithium ion transfer ability, or a mixture of two or more thereof.

5. The separator for secondary batteries according to claim 3,
wherein the inorganic particles are at least one selected from the group consisting of $Al_2O_3$, $SiO_2$, MgO, $TiO_2$ and $BaTiO_2$.

6. The separator for secondary batteries according to claim 3,
wherein the binder polymer is at least one selected from the group consisting of polyvinylidene fluoride (PVdF), polyvinylidene fluoride-hexafluoropropylene, polyvinyl pyrrolidone, polyacrylonitrile, polyvinylidene fluoride-trichloroethylene, polyvinylidene fluoride-chlorotrifluoroethylene (PVdF-CTFE), polymethyl methacrylate, polyvinyl acetate, ethylene-co-vinyl acetate copolymer, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxymethyl cellulose, acrylonitrile butadiene styrene copolymer, polyimide, polyacrylonitrile-styrene copolymer, gelatin, polyethylene glycol, polyethylene glycol dimethyl ether, ethylene-propylene-diene terpolymer (EPDM), sulfonated EPDM, styrene butadiene rubber (SBR), tetrafluoroethylene (TFE), and fluoro rubber.

7. The separator for secondary batteries according to claim 6,
wherein the binder polymer is at least one selected from the group consisting of PVdF, TFE, and polyimide.

8. The separator for secondary batteries according to claim 6,
wherein the binder polymer further comprises at least one selected from the group consisting of baicalin, luteolin, taxifolin, myricetin, quercetin, rutin, catechin, epigallocatechin gallate, butein, piceatannol, a phenolic-based compound comprising tannic acid, pyrogallic acid, amylose, amylopectin, xanthan gum, and an aqueous or non-aqueous polymer consisting of fatty acid system.

9. A secondary battery comprising the separator for secondary batteries of claim 1.

10. The secondary battery according to claim 9, further comprising:
a positive electrode; and
a negative electrode;
wherein the separator is interposed between the positive electrode and the negative electrode and where the first flame retardant inorganic material is asymmetrically present on one surface of a polyolefin substrate facing either the positive electrode or the negative electrode.

* * * * *